(12) United States Patent
Haupert et al.

(10) Patent No.: US 7,233,689 B2
(45) Date of Patent: Jun. 19, 2007

(54) METHOD OF PROCESSING IMAGES FOR DIGITAL SUBTRACTION ANGIOGRAPHY

(75) Inventors: Sylvain Justin Georges André Haupert, Bondy (FR); Peter Maria Johannes Rongen, Eindhoven (NL); Herman Stegehuis, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 337 days.

(21) Appl. No.: 10/234,798

(22) Filed: Sep. 4, 2002

(65) Prior Publication Data

US 2003/0053670 A1 Mar. 20, 2003

(30) Foreign Application Priority Data

Sep. 4, 2001 (FR) .................... 01 11441

(51) Int. Cl.
*G06K 9/00* (2006.01)
(52) U.S. Cl. ..................................... 382/130
(58) Field of Classification Search ..................... None
See application file for complete search history.

(56) References Cited

U.S. PATENT DOCUMENTS

| | | | | |
|---|---|---|---|---|
| 4,551,800 A | * | 11/1985 | Riederer et al. ............ 600/407 |
| 4,559,557 A | * | 12/1985 | Keyes et al. .............. 378/98.11 |
| 4,881,124 A | * | 11/1989 | Yokouchi et al. ........... 378/98.2 |
| 5,204,627 A | * | 4/1993 | Mistretta et al. ............. 324/309 |
| 5,768,405 A | * | 6/1998 | Makram-Ebeid ............ 382/128 |
| 5,848,121 A | * | 12/1998 | Gupta et al. .................. 378/62 |
| 6,009,208 A | * | 12/1999 | Mitra et al. .................. 382/254 |
| 6,404,843 B1 | * | 6/2002 | Vaillant ......................... 378/8 |
| 6,424,730 B1 | * | 7/2002 | Wang et al. ................. 382/128 |
| 6,532,380 B1 | * | 3/2003 | Close et al. ................. 600/431 |

\* cited by examiner

*Primary Examiner*—Samir Anwar Ahmed
*Assistant Examiner*—ONeal R. Mistry
(74) *Attorney, Agent, or Firm*—Douglas B. McKnight

(57) ABSTRACT

The invention relates to the field of digital subtraction angiography. An image processing method is applied to a digitized mask (100) and to a sequence of digitized opacified images (101). A logarithmic function (105) is applied to the values of the pixels of the digitized mask and to the values of the pixels of the sequence of digitized opacified images, and then a subtraction (108) is made of the logarithmic value of each pixel of a digitized opacified image from the logarithmic value of the corresponding pixel in the digitized mask. In order to improve the quality of the images processed, a processing step (102) able to decrease certain pixel values of the digitized mask and of the digitized opacified images is applied before applying the logarithmic function.

15 Claims, 5 Drawing Sheets

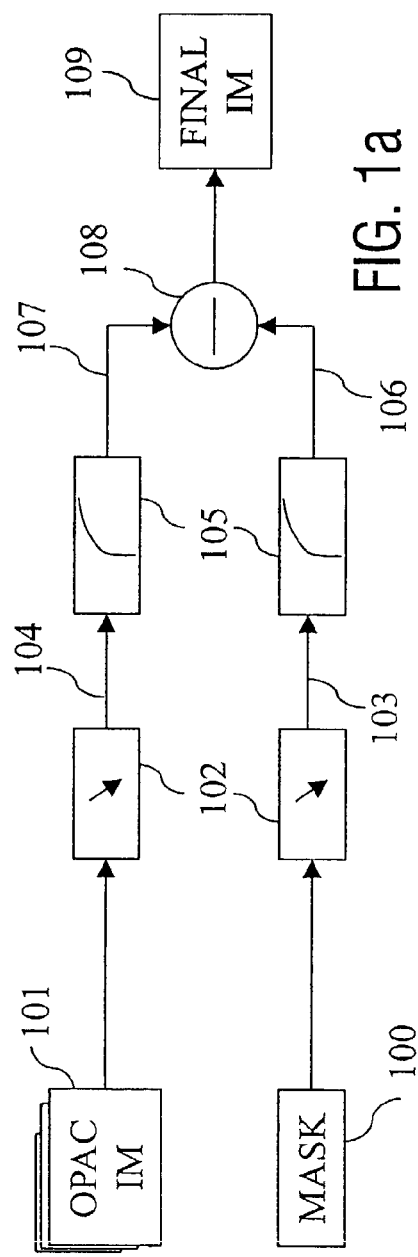
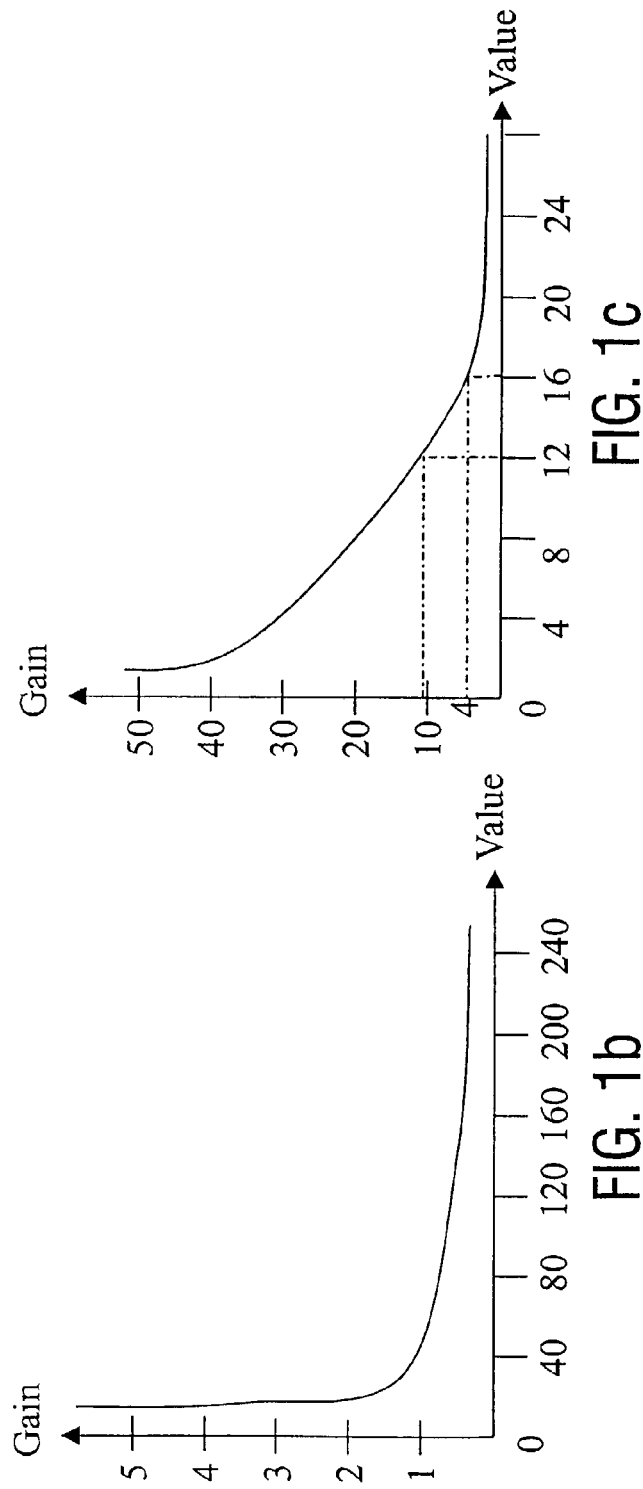
FIG. 1a
FIG. 1b
FIG. 1c

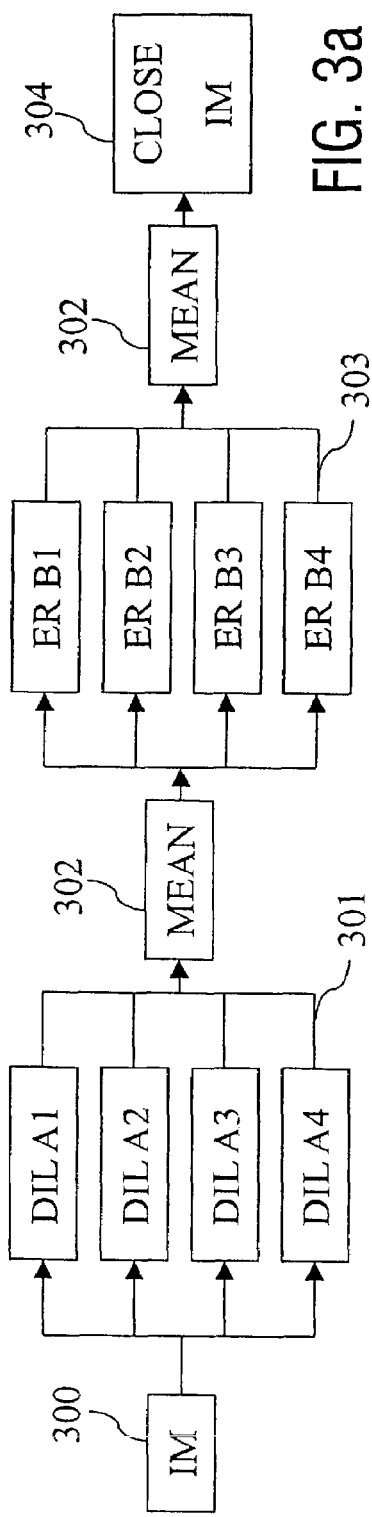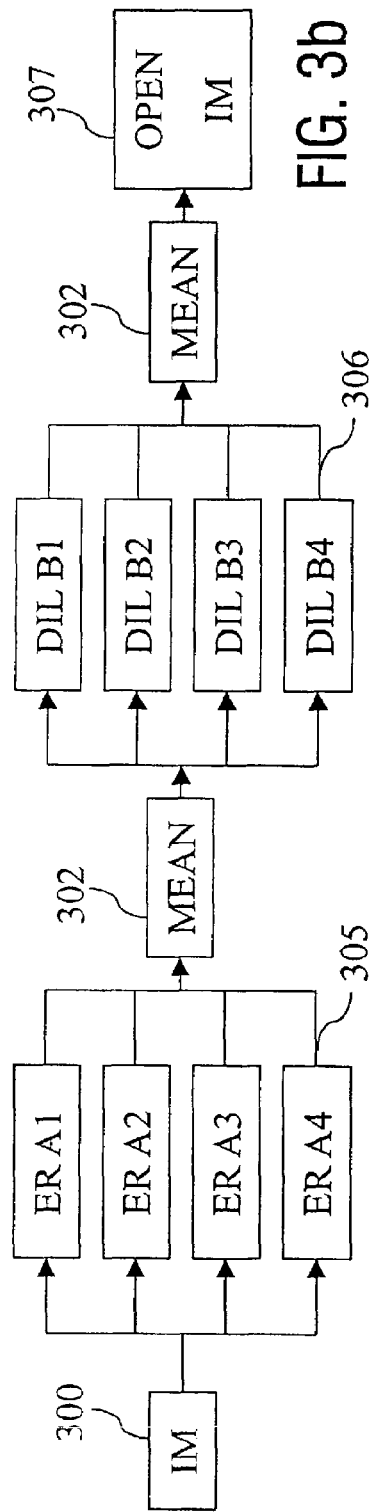

METHOD OF PROCESSING IMAGES FOR DIGITAL SUBTRACTION ANGIOGRAPHY

The invention relates to a method of processing images in order to generate a sequence of digital subtraction angiography images from a digitized mask comprising pixel values and a sequence of digitized opacified images comprising pixel values, the method comprising a step of applying a logarithmic function to the values of the pixels of the digitized mask and to the values of the pixels of the sequence of digitized opacified images in order to obtain logarithmic pixel values, and a step of subtracting the logarithmic value of each pixel of a digitized opacified image from the logarithmic value of the corresponding pixel in the digitized mask.

Digital subtraction angiography is described in a work by R. Kruger and S. Riederer entitled "Basic Concept of Digital Subtraction Angiography" (G. K. Hall Medical Publisher, Boston, Mass., 1984). Such a medical imaging technique is in particular used for studying blood vessels of a patient. X-rays are passed through one region of the patient. On leaving this region, the X-rays are converted into light, which is converted into an electrical signal which makes it possible to obtain an image, referred to as a mask. A contrast agent, for example comprising iodine, is then injected into the blood vessels of the patient. A sequence of opacified images is then obtained by virtue of the X-rays which have passed through the said region. The expression "sequence of images" is to be understood to mean an image or several successive images. The mask and the opacified images are then digitized. The digitized mask comprises pixels each having a brightness value, also referred to as a "gray level", for example between 0 and 255. The same applies to a digitized opacified image. A logarithmic function is then applied to the values of the pixels of the digitized mask and the digitized opacified images. For each pixel of a digitized opacified image, its logarithmic value is then subtracted from the logarithmic value of the corresponding pixel in the digitized mask.

"Logarithmic function" is to be understood to mean a function whose derivative is large for small values of a variable to which it is applied, and then decreases and tends towards zero for large values of the variable. For example, the "Napierian logarithm" function can be applied, or a function f of the type $f(x)=x^{1/n}$ where x is the variable and n is an integer number.

A method as described above makes it possible to obtain a final sequence of images which contains only the blood vessels of the regions studied. This is because the subtraction of the mask eliminates objects which appear in the sequence of opacified images and interfere with an analysis of the vessels, such as tissues or bones. However, the applicant has found that, by applying this method, some vessels do not appear or are not very visible in the final sequence of images, in particular vessels which are superimposed on a dark structure, such as a bone, in the sequence of opacified images.

One object of the invention is to propose a method of processing images making it possible in particular to restore certain vessels which are not very or not at all visible when use is made of the method described in the state of the art. The invention takes account of the following considerations. The application of a logarithmic function increases contrast between dark objects which have close gray levels. This is because such a function has a gain, represented by its derivative, which is high for low values of a variable to which it is applied. Consequently the application of a logarithmic function reveals the vessels in the final sequence of images, even if these vessels are superimposed on dark structures in the sequence of opacified images. This is valid if said dark structures actually have low gray levels. However, it frequently happens, in angiography, that secondary X-radiation (scatter radiation) appears, due to diffraction of the X-rays by certain structures in the region of the patient being studied. Such scatter radiation has in particular the effect of increasing the value of certain pixels of the digitized mask and of the digitized opacified images. Consequently, structures which, in the absence of scatter radiation, should possess low gray levels, have relatively high gray levels. Because of this, the application of the logarithmic function no longer reveals vessels superimposed on structures such as bones.

According to the invention, an image processing method as defined in the opening paragraph is characterized in that it comprises, before the step of applying a logarithmic function, a processing step able to decrease certain pixel values of the digitized mask and of the digitized opacified images.

By reducing certain values of the pixels of the digitized mask and of the digitized opacified images, the effect of the scatter radiation becomes blurred and the application of the logarithmic function once again reveals vessels superimposed on dark structures in the sequence of opacified images. For example, it is possible to measure, for each pixel of the mask and of the digitized opacified images, a contribution of the scatter radiation to the value of said pixel, and to subtract this contribution to this value.

In a preferential embodiment of the invention, said processing step comprises the substep of selecting, in the sequence of digitized opacified images, the lowest pixel value and subtracting a certain fraction of this lowest pixel value from all the values of the pixels in the sequence of digitized opacified images and of the digitized mask. According to this embodiment, it is considered that the scatter radiation makes the same contribution to all the pixels of the mask and of the digitized opacified images, and this contribution is approximated by a fraction, for example one half, of the value of the lowest pixel in the sequence of digitized opacified images. Such an embodiment is particularly simple to implement, since it dispenses with a measurement of the contribution of the scatter radiation to the value of each pixel.

In a first version of the invention, the image processing method is characterized in that it comprises, at the end of the subtraction step, a step of filtering impulse-type noise.

The steps of processing, applying the logarithmic function and subtracting, though they make it possible to restore certain vessels, also introduce noise into the final sequence of images, in particular noise of the impulse type. According to this variant, this impulse noise decreases, in order to facilitate analysis of the sequence of final images by a physician.

In a preferential embodiment of this first variant, said filtering step uses a morphological filter.

The use of such a filter eliminates a good part of the impulse noise, whilst preserving details which are important for the analysis carried out by the physician, for example fine vessels.

In a second version of the invention, the image processing method is characterized in that it also comprises, before the processing step, a temporal filtering step.

The effect of the processing step and the application of the logarithmic function is to amplify noise present in the mask and the sequence of opacified images, when this noise is situated in dark areas. However, quantum noise is inherent in digital subtraction angiography. According to this second version, a good part of the quantum noise is eliminated before the processing step and the application of the logarithmic function, so that little quantum noise remains in the final image sequence.

The invention will be further described with reference to examples of embodiments shown in the drawings to which, however, the invention is not restricted:

FIG. 1a illustrates an image processing method according to the invention;

FIG. 1b is a gain curve for a logarithmic function applied in the method of FIG. 1;

FIG. 1c depicts the gain curve of FIG. 1b for low pixel values;

FIGS. 3a to 3c illustrate opening and closing operations applied in the filtering step of FIG. 2;

FIG. 4b illustrates an image processing method using the temporal filter of FIG. 4a;

Figure 2:
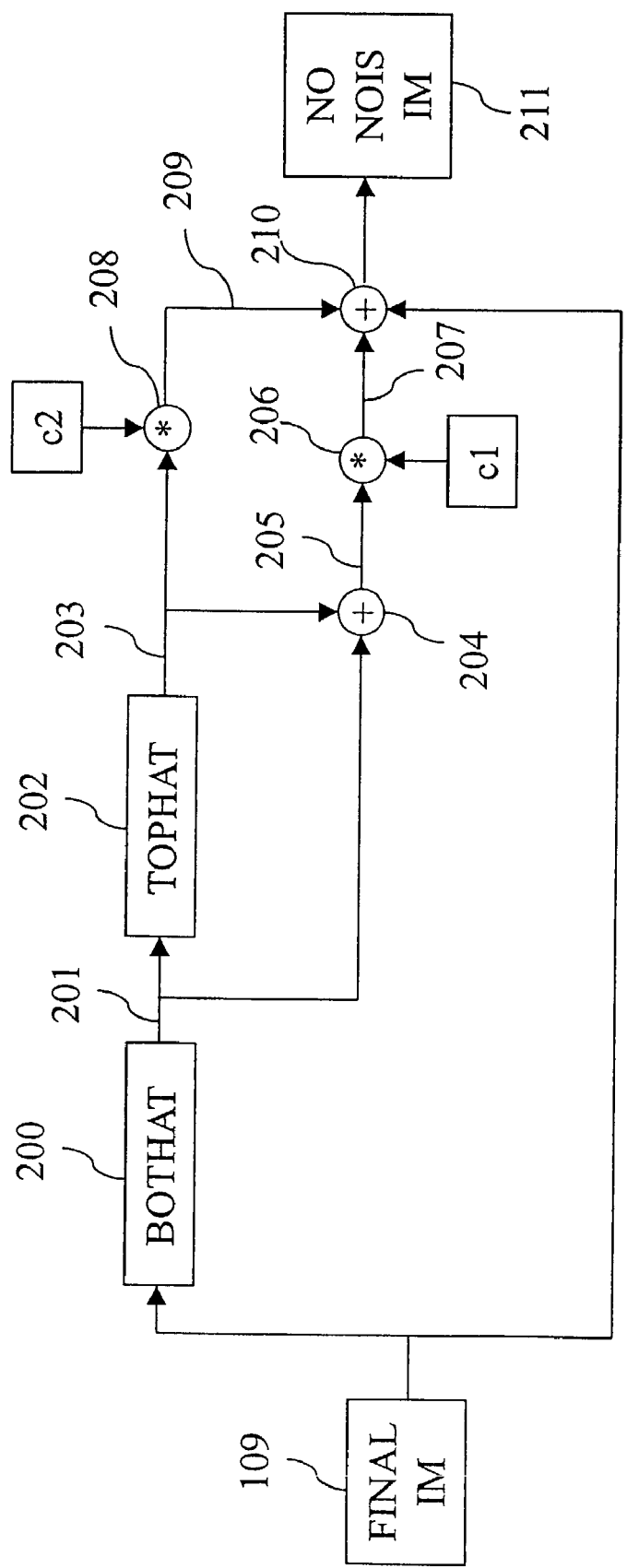
FIG. 2 illustrates a filtering step used in a first version of the invention.

FIG. 1a illustrates an image processing method according to the invention. A digitized mask 100 is obtained by the detection of X-rays which have passed through a region of a patient, followed by digitization. A sequence of digitized opacified images 101 is obtained by the detection of the X-rays which have passed through the same region, followed by digitization, a contrast agent having been injected into the blood vessels of the patient. The digitized mask 100 and the sequence of digitized opacified images 101 successively undergo a processing step 102 for giving respectively a processed mask 103 and a sequence of processed opacified images 104, and a step of applying a logarithmic function 105, in order to form respectively a logarithmic mask 106 and a sequence of logarithm opacified images 107. The logarithmic mask 106 is then subtracted from each image in the sequence of logarithmic opacified images 107, during a subtraction step 108, and a final image sequence 109 is obtained.

It should be noted that, in FIG. 1a, the method according to the invention is applied to several successive opacified images, which form the sequence of digitized opacified images 101, that is to say, the steps 102, 105 and 108 are successively applied to each digitized opacified image in the sequence 101. Of course, the method according to the invention can be applied to only one digitized opacified image, that is to say it is not necessary to have several successive images in order to apply this method.

FIG. 1b depicts a gain curve for the logarithmic function applied during step 105. FIG. 1c depicts the same gain curve for low pixel values. The gain curve shows, on the Y-axis, the gain in the logarithmic function according to the value of a pixel, shown on the X-axis and lying between 0 and 255, the low values corresponding to dark areas, the high values to light areas. A pixel having a certain value after step 102 will, after step 105, find its value multiplied by the corresponding gain on said gain curve. It should be noted that a conversion table LUT (LUT is the abbreviation of the English expression Look-Up Table) is generally used for applying the logarithmic function.

In one case, to arrive at a better understanding of the invention, it will first of all be considered that the processing step 102 is not applied.

In a theoretical case the scatter radiation is zero and the concern is with a dark area comprising a blood vessel superimposed on a bone. It is considered, for example that the pixels corresponding to the blood vessel have a value equal to 12 in the sequence of digitized opacified images 101, and that the pixels corresponding to the bone have a value equal to 16 in the digitized mask 101. These values are close so that, if the digitized mask 100 is subtracted from the sequence of digitized opacified images 101 without applying the logarithmic function, the blood vessel is not very visible in the final image sequence 109. By means of the logarithmic function, the pixels of the vessel are multiplied by approximately 10 and the pixels of the bone by approximately 4, as shown in FIG. 1c. Consequently, after applying the logarithmic function, the pixels of the vessel have a value of approximately 120 and the pixels of the bone have a value of approximately 64. The difference in gray levels is then sufficient so that, after the subtraction step 108, the blood vessel appears in the final image sequence 109.

However, because of the scatter radiation, the value of the pixels of the digitized mask 100 and of the sequence of digitized opacified images 101 increases. For example, instead of being equal to 12, as in the absence of scatter radiation, the value of the pixels of the vessel may be equal to 24. The value of the pixels of the bone may then be equal to 28. However, for pixel values of 24 and 28, the gain in the logarithmic function is almost identical, as shown in FIG. 1c. Consequently, in spite of the application of the logarithmic function, the pixels of the vessel in the sequence of logarithmic opacified images 107 have values close to the bone pixels in the logarithmic mask 106, so that the subtraction step 108 cannot reveal the vessel distinctly in the final image sequence 109, which is a drawback.

According to the invention, a processing step 102 is applied which remedies this drawback. This is because, during this processing step 102, the values of certain pixels are decreased. For example, if a system is available for measuring the contribution of the scatter radiation to the value of each pixel in the digitized mask 100 and in the sequence of digitized opacified images 101, this contribution can be subtracted from the value of each pixel. Thus, in the processed mask 103 and in the sequence of processed opacified images 104, the pixels have values identical to the values which would be obtained in the absence of scatter radiation. In this way, for reasons indicated above, after applying the logarithmic function during step 105, the subtraction step 108 is able to distinctly restore the vessels which, in the sequence of digitized opacified images 101, are superimposed on dark structures such as bones. However, such a system is generally bulky and technically complex.

This is why, in a preferential embodiment of the invention, a certain fraction of the lowest pixel value in the sequence of digitized opacified images 101 is subtracted from the values of all the pixels of the digitized mask 100 and from the sequence of digitized opacified images 101. For example, this fraction may be equal to 50%. If the example described above is taken up again, because of the scatter radiation, the pixels of a vessel have a value equal to 24 and the pixels of a bone a value equal to 28. If it is assumed that, in the sequence of digitized opacified images 101, the vessel is the darkest structure, that is to say the lowest pixel value is 24. If there is deducted from the values of all the pixels of the digitized mask 100 and of the sequence of digitized opacified images 101 one half of this lowest pixel value, that is to say 12, the vessel pixels will, in the sequence of processed opacified images 104, have a value equal to 12, and the bone pixels will, in the processed mask 103, have a value equal to 16. Because of this, for reasons indicated above, after applying the logarithmic function during step 105, the subtraction step 108 is able to restore the vessel distinctly. In addition, this method is particularly simple to implement. This is because, knowing the values of all the pixels of the sequence of digitized opacified images 101, it is easy to select the lowest of them, and then to deduct a predetermined fraction of this lowest value from all the pixels of the digitized mask 100 and of the sequence of digitized opacified images 101.

However, the use of the method according to the invention may introduce noise into the final image sequence 109, in particular noise of the impulse type. Such a noise is characterized by a granular appearance of the final image sequence 109. Such a noise is also termed "pepper and salt noise" or "speckle noise".

This is because impulse-type noise is naturally present in angiography images. Though this impulse noise is little visible in the sequence of digitized opacified images 101, it is however amplified by a combination of the processing step 102 and the step of applying a logarithmic function 105. This is because, when this noise is situated in dark areas, it is amplified by the application of the logarithmic function during step 105, since the gain in the logarithmic function is high for low pixel values. In addition, the processing step 102 having the effect of reducing the values of the pixels corresponding to this impulse noise, the gain applied to these values will be all the higher, and therefore this impulse noise will be all the more amplified. This is a drawback, since the analysis of the final image sequence 109 is interfered with by such impulse noise.

According to a first version of the invention, an impulse noise filtering step is applied to the final image sequence 109 in order to remedy the latter drawback. This filtering step consists of applying, to the final image sequence 109, a filter able to reduce the impulse noise. For example, a non-linear filter, such as a median filter, can be applied. It is also possible to apply a combination of a linear filter and a non-linear filter, such as an FMH (FMH is the abbreviation of the English expression "Finite impulse response Median Hybrid filter"), or a filter requiring an a priori knowledge of the noise, such as a Wiener filter. Preferentially, the impulse noise filtration step uses a morphological filter.

Morphological filters are described in a work by Jean Serra entitled "Image Analysis and Mathematical Morphology" (Academic Press, London, 1982). A morphological filter is applied to an image comprising pixels. A morphological filter may be a morphological operation or a combination of morphological operations and possibly other operations, such as a subtraction or addition. There are various morphological operations, which use structuring elements, also referred to as kernels, which are applied to a vicinity of each pixel of the image. Since morphological filters are known to persons skilled in the art, they will not be detailed further here. However, definitions of certain morphological operations are given below:

Erosion of an image replaces the value of each pixel by the lowest value of the vicinity to which the kernel is applied.

Expansion of an image replaces the value of each pixel by the largest value of the vicinity to which the kernel is applied.

Opening an image consists of an erosion followed by an expansion; an open image is obtained.

Closure consists of an expansion followed by an erosion; a closed image is obtained.

A Top-Hat function consists of subtracting from an image its open, image.

A Bot-Hat function consists of subtracting an image from its closed image.

FIGS. 2 to 3c illustrate an example of a morphological filter applied to the final image sequence 109. A Bot-Hat function 200 is applied to the final image sequence 109, in order to give a first image sequence 201. A Top-Hat function 202 is then applied to the first image sequence 201 in order to give a second image sequence 203. Each pixel value of the first image sequence 201 is multiplied by (−1), and a first addition 204 is made between the first image sequence 201 thus processed and the second image sequence 203, in order to give a third image sequence 205. Each pixel value in the third image sequence 205 undergoes a first multiplication 206 by a first adjustable parameter c1, in order to give a fourth image sequence 207. Each pixel value of the second image sequence 203 undergoes a second multiplication 208 by a second adjustable parameter c2, in order to give a fifth image sequence 209. Finally, a second addition 210 is made, between the final image sequence 109, the fourth image sequence 207 and the fifth image sequence 209, in order to give a noiseless image sequence 211.

FIGS. 3a and 3c illustrate a closure used in the Bot-Hat function 200 of FIG. 2. An image 300 undergoes, during a first expansion step, four expansions using four kernels A1 to A4. Four expanded images are obtained, which undergo an averaging step 302 in order to give a first averaged image, which then undergoes, during a first erosion step 303, four erosions using four kernels B1 to B4. Then four eroded images are obtained, which are subjected to the averaging step 302 in order to give a closed image 304. If the image 300 is an image in the final image sequence 109, this closure makes it possible to eliminate a good part of the impulse noise, to keep thick vessels and to eliminate certain fine vessels. The kernels used take account of the various possible orientations of the vessels and of the noise to be eliminated, which is an impulse noise which therefore generally extends over less than three pixels. Thus the Bot-Hat function 200 in FIG. 2, when applied to the final image sequence 109, makes it possible to obtain the first image sequence 201, which contains fine vessels as well as impulse noise, in reverse gray scale since a subtraction is made.

FIGS. 3b and 3c illustrate an opening used in the Top-Hat function 202 of FIG. 2. An image 300, during a second erosion step 305, undergoes four erosions using the four kernels A1 to A4. Four eroded images are obtained, which are subjected to the averaging step 302 in order to give a second averaged image, which is then subjected, during a second expansion step 306, to four expansions using the four kernels B1 to B4. Then four expanded images are obtained, which are subjected to the averaging step 302 in order to give an open image 307. If the image 300 is an image in the first image sequence 201, this opening makes it possible to keep the fine vessels, in reverse gray scale.

Thus the Top-Hat function 202 of FIG. 2, when applied to the first image sequence 201, makes it possible to obtain the second image sequence 202, which contains the impulse noise, in reverse gray scale. The first addition 204 therefore makes it possible to obtain the third image sequence 205, which contains the fine vessels. Consequently, if it is assumed that the adjustable parameters c1 and c2 are equal to one, the second addition 210 consists of adding the fine vessels and subtracting the impulse noise from the final image sequence 109. This therefore makes it possible to eliminate the impulse noise and to amplify the fine vessels which, in the final image sequence 109, are difficult to analyze because of the impulse noise. The adjustable parameters c1 and c2 allow fine adjustment of the contributions of the impulse noise and the fine vessels in the noiseless image 211.

Since the method according to the invention tends to amplify noise present in the sequence of digitized opacified images 101, it is desirable to reduce this noise before applying the processing step 102 and the step of applying the logarithmic function 105. However, in the sequence of digitized opacified images 101, a quantum noise generally appears, which is a random noise, that is to say it is not identical from one image to another in the sequence of digitized opacified images 101. This quantum noise represents a drawback, since it is superimposed on fine blood vessels in the final image sequence 109.

According to a second version of the invention, a temporal filtering step is applied in order to remedy this drawback. It should be noted that this second version of the invention can be implemented only if several successive opacified images are available. It cannot be implemented if only one opacified image is available.

Figure 4A:
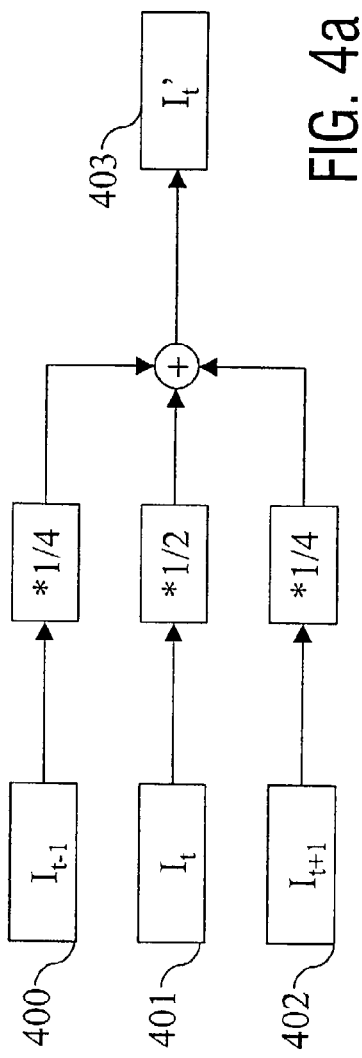
FIG. 4a illustrates a temporal filter used in a second version of the invention.

FIG. 4a illustrates an example of a temporal filter used for implementing this second version of the invention. The sequence of digitized opacified images 101 comprises several successive images. For each image 401 of this sequence 101, an image 400 which precedes it directly, and an image 402 which follows it directly are considered. The values of the pixels of the image 400 are multiplied by one quarter, the values of the pixels of the image 401 are multiplied by one half and the values of the pixels of the image 402 are multiplied by one quarter. Thus the values obtained are added, and in this way a filtered image 403 is obtained. A set of images 403 thus filtered forms a filtered image sequence 405. It should be noted that such a temporal filter can also be applied to a sequence of masks, in a case in which several successive masks are available.

Figure 4B:
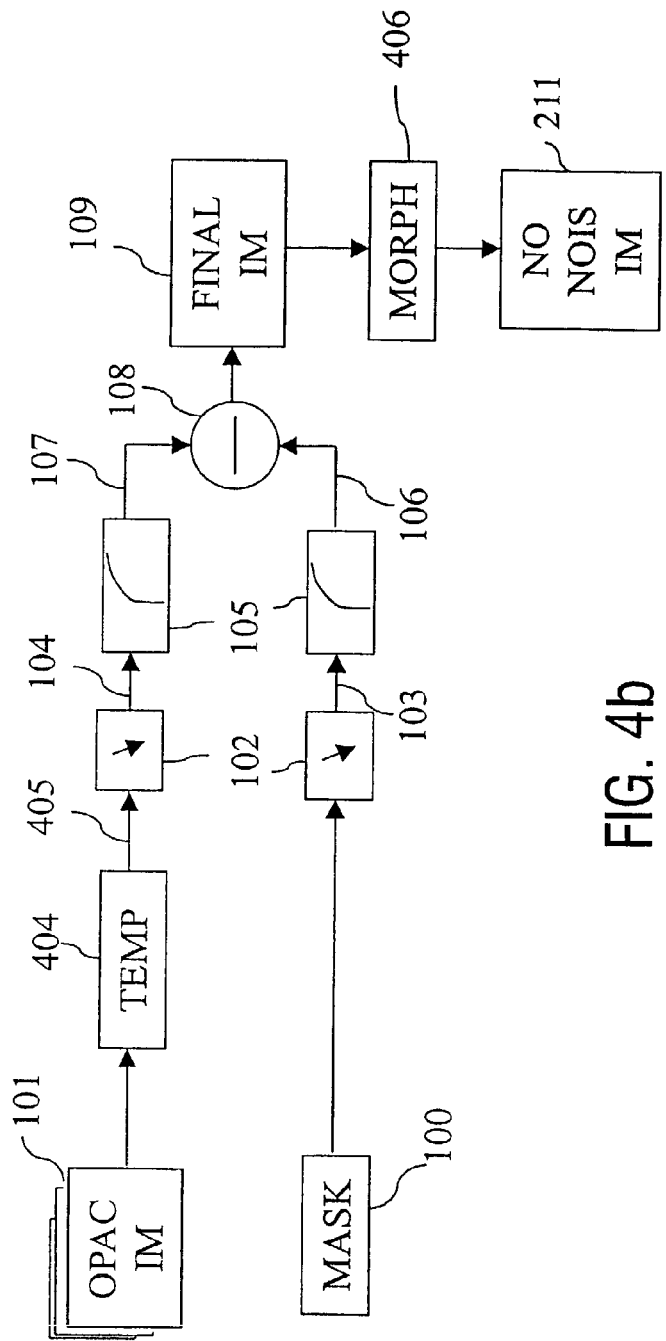

FIG. 4b illustrates a processing method which can be applied to the sequence of digitized opacified images 101 and to the digitized mask 100 in order to obtain the sequence of noiseless images 211. This method comprises, in addition to the steps described in FIG. 1a, a temporal filtering step 404, as described in FIG. 4a, and a morphological filtering step 406, as described in FIG. 2.

Figure 5:
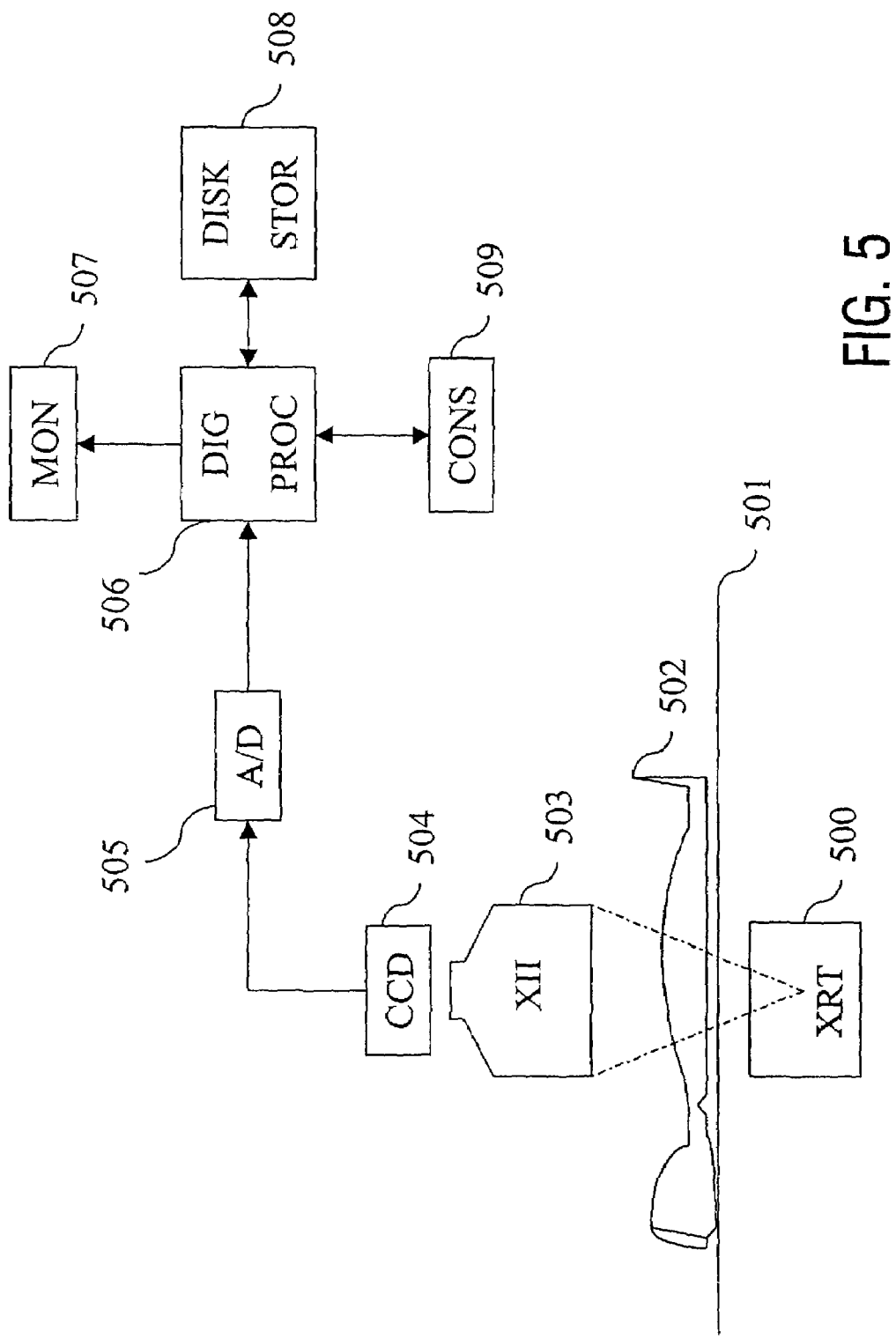
FIG. 5 illustrates a medical imaging apparatus implementing the invention.

FIG. 5 illustrates a medical imaging apparatus implementing the invention. The apparatus comprises an X-ray source 500, a table 501 intended to receive a patient 502 to be examined, a photon converter 503, a camera 504, an analog to digital converter 505, an image processing device 506, a monitor 507, data storage means 508 and an interface 509.

The photon converter 503 converts into light the X-rays which were generated by the X-ray source 500 and which pass through the patient 502. The camera 503 converts this light into an electrical signal, which is then digitized by means of the analog to digital converter 505. The image processing device 506 implements the method according to the invention, and the monitor 507 displays a sequence of digital subtraction angiography images after processing by the method according to the invention. The storage means 508 in particular store the successive images of the sequence of digitized opacified images 101 and the digitized mask 100. The interface 509 makes it possible for example to adjust certain adjustable parameters, such as c1 and c2. It should be noted that the image processing device 506 can be implemented in the form of a programmable microprocessor or a circuit comprising components such as filters, memories or logic operators intended to perform various steps described in the invention.

The above description with reference to the figures illustrates the invention rather than limits it. In this regard, a few remarks are given below. In FIGS. 1a and 1b, an example of a logarithmic function gain curve is given. Of course, other logarithmic functions can be used, having slightly different gain curves, provided that these functions have properties necessary for implementing the invention.

FIG. 2 illustrates an example of a morphological filter. Of course, other morphological filters can be used for reducing the impulse noise. In the same way, an opening, a closure and kernels are given in FIGS. 3a to 3c. Other openings, closures and kernels can be used, provided that their application in a morphological filter allows reduction of the impulse noise.

In FIG. 4a, an example of a temporal filter is illustrated, other temporal filters can be used, provided that they make it possible to reduce the noise in the sequence of digitized opacified images 101 and possibly in the digitized mask 100. In principle, it is possible to implement the method according to the invention by means of a data processing device, for example a suitably programmed computer circuit. A set of instructions contained in a programming memory can cause the computer circuit to perform the various steps described above. The set of instructions can be loaded into the programming memory by reading a data medium such as, for example, a disk which contains the set of instructions. The reading can be performed via a communication network such as, for example, the Internet. In at case, a service provider will make the set of instructions available to interested parties.

The invention claimed is:

1. An image processing method for generating a sequence of digital subtraction angiography images from a digitized mask comprising pixel values and a sequence of digitized opacified images comprising pixel values, said method comprising the steps of:

applying a logarithmic function to the values of the pixels of the digitized mask and to the values of the pixels of the sequence of digitized opacified images in order to obtain logarithmic pixel values;

subtracting the logarithmic value of each pixel of a digitized opacified image from the logarithmic value of the corresponding pixel in the digitized mask;

said method being characterized in that it comprises, before the step of applying a logarithmic function, a processing step able to decrease certain pixel values of the digitized mask and of the digitized opacified images wherein said processing step comprises the substeps of:

selecting, in the sequence of digitized opacified images, the lowest pixel value;

subtracting, from all the values of the pixels in the sequence of digitized opacified images and the digitized mask, a certain fraction of the selected lowest pixel value, wherein said certain fraction is less than 1 where the applying a logarithmic function to the values of the pixels is applied approximately just before the subtraction step to the individual pixels of the images.

2. The image processing method as claimed in claim 1, wherein, at the end of the subtraction step, an impulse noise filtering step.

3. The image processing method as claimed in claim 2, characterized in that said filtering step uses a morphological filter.

4. The image processing method as claimed in claim 1, wherein, before the processing step, a temporal filtering step.

5. The image processing method as claimed in claim 4, characterized in that it comprises, at the output from the subtraction step, an impulse noise filtering step.

6. A computer program comprising program code instructions for executing the steps of the method as claimed in claim 1 when said program is executed on a processor.

7. An image processing system comprising a processor intended for using a computer program as claimed in claim 6 and a device for projecting the images processed in accordance with said method.

8. A medical imaging apparatus comprising a digital image acquisition device and an image processing system as claimed in claim 7.

9. The imaging processing method of claim 1, wherein said certain fraction is about 50 percent.

10. A medical imaging apparatus comprising:
means for generating a sequence of digital subtraction angiography images from a digitized mask comprising pixel values and a sequence of digitized opacified images comprising pixel values,
means for applying a logarithmic function to the values of the pixels of the digitized mask and to the values of the pixels of the sequence of digitized opacified images in order to obtain logarithmic pixel values;
means for subtracting the logarithmic value of each pixel of a digitized opacified image from the logarithmic value of the corresponding pixel in the digitized mask;
means for decreasing certain pixel values of the digitized mask and of the digitized opacified images prior to applying the logarithmic function;
means for selecting, in the sequence of digitized opacified images, the lowest pixel value; and
means for subtracting, from all the values of the pixels in the sequence of digitized opacified images and the digitized mask, a certain fraction of the selected lowest pixel value, wherein said certain fraction is less than 1
where the applying a logarithmic function to the values of the pixels is applied approximately just before the subtraction step to the individual pixels of the images.

11. The medical imaging apparatus of claim 10, wherein said certain fraction is about 50 percent.

12. The medical imaging apparatus of claim 10 further comprising an impulse noise filter.

13. The medical imaging apparatus of claim 10 further comprising a temporal filter.

14. A computer program for generating a sequence of digital subtraction angiography images from a digitized mask comprising pixel values and a sequence of digitized opacified images comprising pixel values, the execution of the computer program creating the following actions:
applying a logarithmic function to the values of the pixels of the digitized mask and to the values of the pixels of the sequence of digitized opacified images in order to obtain logarithmic pixel values;
subtracting the logarithmic value of each pixel of a digitized opacified image from the logarithmic value of the corresponding pixel in the digitized mask;
decreasing certain pixel values of the digitized mask and of the digitized opacified images prior to applying the logarithmic function;
selecting, in the sequence of digitized opacified images, the lowest pixel value; and
subtracting, from all the values of the pixels in the sequence of digitized opacified images and the digitized mask, a certain fraction of the selected lowest pixel value, wherein said certain fraction is less than 1
where the applying a logarithmic function to the values of the pixels is applied approximately just before the subtraction step to the individual pixels of the images.

15. The computer program of claim 14, wherein said certain fraction is about 50 percent.

* * * * *